United States Patent
Ludwig et al.

(10) Patent No.: US 8,204,244 B2
(45) Date of Patent: Jun. 19, 2012

(54) SPARE TIRE COVER-MOUNTED LOUDSPEAKER

(75) Inventors: Christopher Ludwig, White Lake, MI (US); Bradford Subat, Northborough, MA (US)

(73) Assignee: Bose Corporation, Framingham, MA (US)

( * ) Notice: Subject to any disclaimer, the term of this patent is extended or adjusted under 35 U.S.C. 154(b) by 720 days.

(21) Appl. No.: 12/236,773

(22) Filed: Sep. 24, 2008

(65) Prior Publication Data

US 2010/0074453 A1    Mar. 25, 2010

(51) Int. Cl.
   *H04R 1/02* (2006.01)
(52) U.S. Cl. .............................. 381/86; 381/389; 381/302
(58) Field of Classification Search .................. 381/389
   See application file for complete search history.

(56) References Cited

U.S. PATENT DOCUMENTS

| | | | |
|---|---|---|---|
| 3,938,617 A | 2/1976 | Forbes | |
| 4,597,470 A | 7/1986 | Takagi et al. | |
| 2006/0291687 A1* | 12/2006 | Maekawa | 381/389 |
| 2007/0261911 A1 | 11/2007 | Nichols et al. | |

FOREIGN PATENT DOCUMENTS

| | | | |
|---|---|---|---|
| DE | 9100354 U1 | 4/1991 | |
| EP | 0252522 A2 | 1/1988 | |
| EP | 0653331 | 5/1995 | |
| EP | 1130943 A1 | 9/2001 | |
| EP | 1572498 A1 | 9/2005 | |
| EP | 1713297 A2 * | 10/2006 | |
| JP | 4150195 A | 5/1992 | |
| JP | 9175282 A | 7/1997 | |

OTHER PUBLICATIONS

Invitation to Pay Additional Fees for PCT/US2009/056818, dated Jan. 26, 2011, 6 pages.
International Search Report and Written Opinion dated Mar. 7, 2011 for PCT/US2009/056815, 18 pages.
Team-integra.net, "Spare Tire Sub Box," http://www.team-integra.net/sections/articles/showArticle.asp?ArticleID=149#, Jul. 2001, printed Nov. 10, 2008.
Club Polk, "Spare Tire Enclosure?," http://www.polkaudio.com/forums/showthread.php?t=178, Feb. 2002, printed Nov. 10, 2008.

* cited by examiner

*Primary Examiner* — David Vu
*Assistant Examiner* — Jonathan Han
(74) *Attorney, Agent, or Firm* — Bose Corporation

(57) ABSTRACT

A spare wheel well cover includes an electro-acoustic transducer coupled to an opening in the spare wheel well cover. The spare wheel well cover and loudspeaker are arranged to cooperate with a spare wheel well to form an acoustic volume when the spare wheel well cover is secured to the spare wheel well.

12 Claims, 4 Drawing Sheets

SPARE TIRE COVER-MOUNTED LOUDSPEAKER

BACKGROUND

This disclosure relates to a spare tire cover-mounted loudspeaker.

The spare wheel well of an automobile has been used as a location for a loudspeaker enclosure. In some examples, as shown in FIG. 1, a loudspeaker assembly 30 providing an acoustic volume 36 is located inside the volume 13 of the spare wheel assembly 10.

SUMMARY

In general, in some aspects, a spare wheel well cover includes an electro-acoustic transducer coupled to an opening in the spare wheel well cover. The spare wheel well cover and electro-acoustic transducer are arranged to cooperate with a spare wheel well including a spare wheel to form an acoustic volume when the spare wheel well cover is secured to the spare wheel well.

Implementations may include one or more of the following features. A gasket surrounds a perimeter of the spare wheel well cover. A bass reflex port is coupled to a second opening in the spare wheel well cover. A bass reflex port surrounds the electro-acoustic transducer in the opening. The spare wheel well cover is further arranged to cooperate with the spare wheel well to form a bass reflex port around a periphery of the spare wheel well cover. The spare wheel well cover is defined by a circumference having a notch, the notch corresponding to a protrusion in a structure of a vehicle forming the spare wheel well.

In general, in some aspects, a spare wheel well of an automobile has a spare wheel well cover that includes an electro-acoustic transducer coupled to an opening in the spare wheel well cover. A fastener is operable to secure the spare wheel well cover to the spare wheel well with a spare wheel enclosed such that the spare wheel well cover and the electro-acoustic transducer cooperate with the spare wheel well including the spare wheel to form an acoustic volume.

Implementations may include one or more of the following features. The fastener includes a latch secured to a vehicle structure surrounding the spare wheel well and selectively operable to apply downward force on the spare wheel well cover. The fastener includes a protrusion of a vehicle structure, and the spare wheel well cover is defined by a circumference having notch, the notch corresponding to the protrusion, such that when the spare wheel well cover is positioned vertically lower than the protrusion, and rotated such that the notch and protrusion do not align, the protrusion applies downward force on the spare wheel well cover. The protrusion includes a wedge-shaped structure configured to increase the downward pressure on the spare wheel well cover as the notch is rotated away from the protrusion. The protrusion includes a spring configured to apply the downward pressure on the spare wheel well cover when the notch is rotated away from the protrusion. The spare wheel well cover includes an extension extending into the spare wheel well, and the fastener includes a bolt and nut securing the cover to a floor of the spare wheel well, such that a spare wheel may be secured between the extension and the floor.

Advantages include providing a greater acoustic volume than a self-contained bass box while adding less weight to the vehicle. Storage of and access to the spare wheel is preserved.

Other features and advantages will be apparent from the description and the claims.

DESCRIPTION

Figure 1:
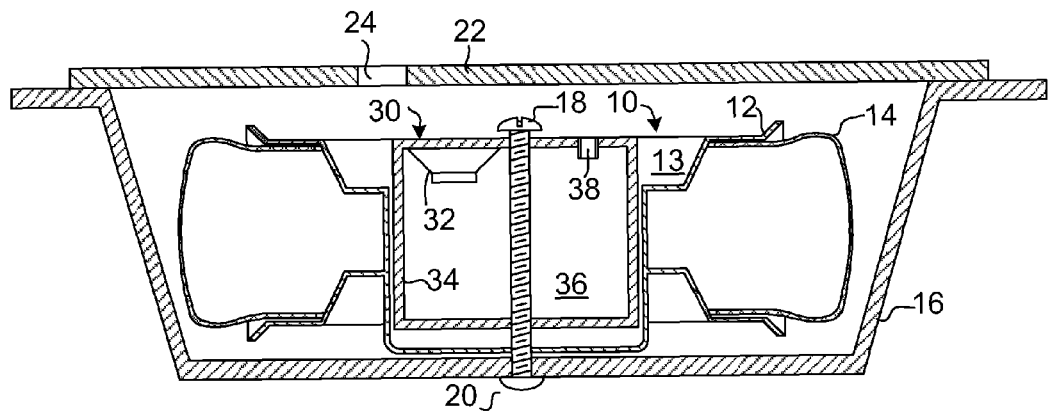
FIG. 1 shows a cross-sectional view of a spare tire and wheel assembly with a loudspeaker enclosure.
Figure 2:
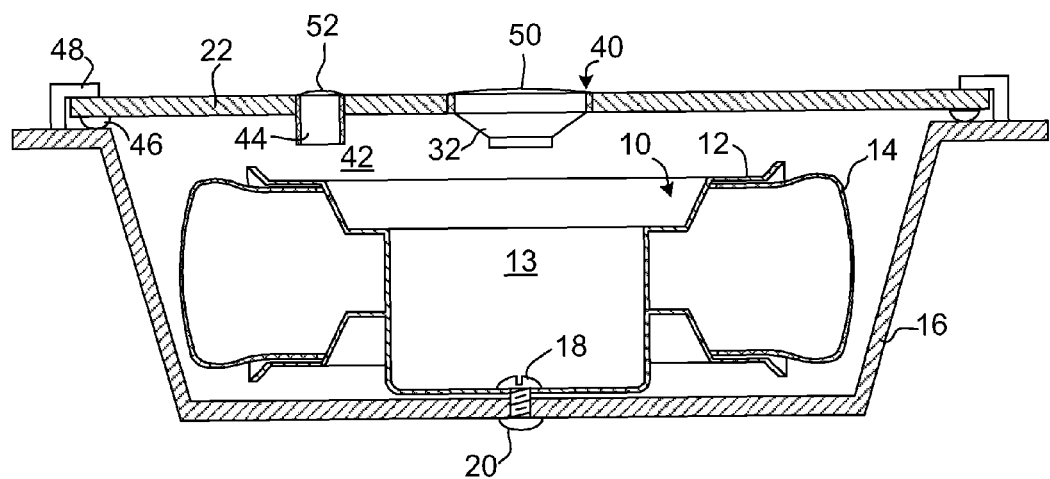
FIGS. 2 and 4 through 8 show cross-sectional views of a loudspeaker using a spare wheel well as an enclosure.

As shown in FIGS. 1 and 2, a spare wheel assembly 10 includes a wheel 12 (sometimes referred to as a "rim") and a tire 14. The spare wheel assembly is typically stored in a spare wheel well 16. The spare wheel is held in place by a bolt 18 and nut 20 and covered by a cover 22. In some examples, as in FIG. 1, a loudspeaker assembly 30 is located in the interior volume 13 of the wheel and also secured by the bolt 18 and nut 20. The loudspeaker assembly 30 includes a least one electro-acoustic transducer 32 mounted in an enclosure 34 that defines an acoustic volume 36. By acoustic volume, we refer to an enclosed volume of air to which one face of an acoustic transducer is coupled, the volume being used to control the acoustic output of the transducer. An acoustic volume may be sealed or unsealed with respect to the surrounding environment. As a general rule, as the size of this volume is increased, the sound reproduced by the electro-acoustic transducer can be extended to lower frequencies for a given output level. In some examples, as shown, the loudspeaker also includes a bass-reflex port 38 that vents the acoustic volume 36 to the listening area in a controlled manner. The acoustic mass of air in this port will, at some frequency, resonate with the volume of air in the acoustic volume, this resonance generally being used to augment the lowest reproduced frequencies. In some examples, sound produced by the loudspeaker assembly 30 is coupled to the listening area through an opening 24 in the cover 22.

To provide a larger acoustic volume and reduce the number of parts, as shown in FIG. 2, the enclosure 34 is eliminated and the transducer 32 is directly mounted to an opening 40 in the cover 22. This arrangement uses the entire volume 42 of the spare wheel well 14 (including the interior volume 13 of the spare wheel) as the acoustic volume. In some examples, a bass-reflex port 44 is also located in the cover 22. In some examples, the volume 42 is acoustically sealed around the perimeter of the cover 22 by a gasket 46. Clamps 48 around the perimeter of the cover 22 hold the cover in place and maintain pressure on the gasket 46. The clamps allow the cover to be removed by the user, such that the spare wheel well remains usable to store the spare wheel.

Grilles 50, 52 may be provided over each of the transducer 32 and the port 44 to protect the transducer against the contents of the trunk and to prevent debris from falling into the volume 42 through the port. Other provisions against environmental factors may include waterproofing the transducer, such as by using a waterproof material for the diaphragm and sealing the electronic components, and providing sealed electrical connections between the transducer and the vehicle's wiring.

One advantage of attaching the transducer 32 to the cover 22 and eliminating the enclosure 34 is the size of the acoustic volume 42 provided by the wheel well 16. In some examples, the enclosure 34 is typically around 6 to 8 L. The spare wheel well, in contrast, provides a significantly larger volume of around 50 to 70 L, even with the wheel and tire present. In one example, with the port 44 having a 75 mm diameter and 100 mm length, the port resonates at approximately 32 Hz. In some examples, the port is located circumferentially around the transducer, rather than as a separately located opening.

Another advantage of attaching the transducer 32 to the cover 22 is that it allows use of a transducer of larger diameter. The diameter of the transducer in the self-contained assembly 30 may be constrained by the space available between the outer edge of the enclosure 34 and the centrally-located bolt 18. In some examples, a transducer having a diameter of about 140 mm has been used. The transducer mounted to the cover 22 is not so constrained, and can therefore be larger. In some examples, a transducer having a diameter of about 200 mm is used. A larger transducer typically provides greater power output at a given frequency and can produce audible output at lower frequencies than a smaller transducer.

Eliminating the enclosure 34 in favor of mounting the transducer directly to the cover 22 has a further advantage of decreasing the total mass of the system, as long as the additional parts (e.g., the gasket 46 and mounting provisions such as clamps 48) have less total mass than the enclosure 34.

Figure 3A:
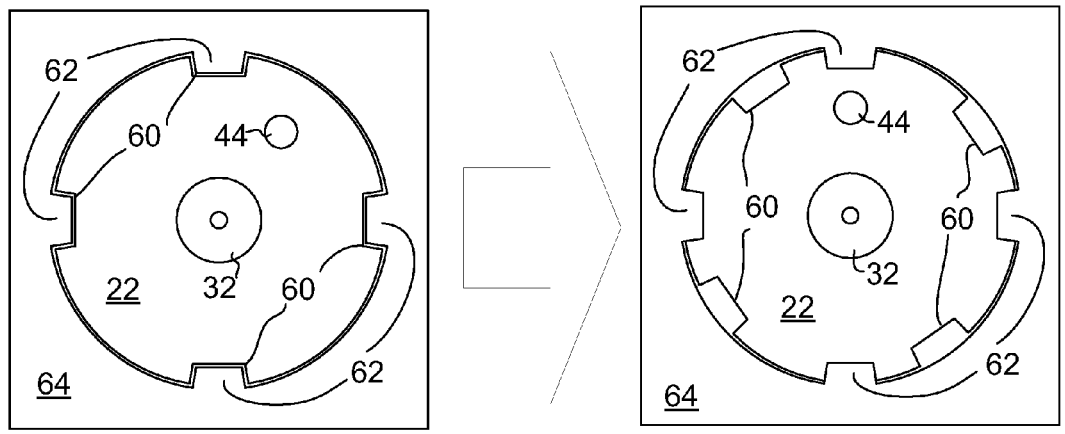
FIG. 3A shows a plan view of a spare wheel well cover in two positions.
Figures 3B, 3C:
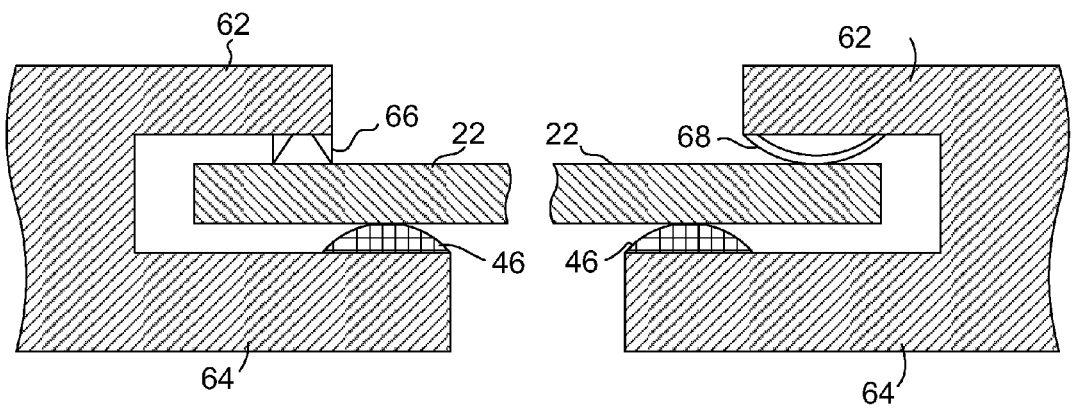
FIGS. 3B and 3C show cross-sectional views of spare wheel well cover attachment mechanisms.
Figure 3D:
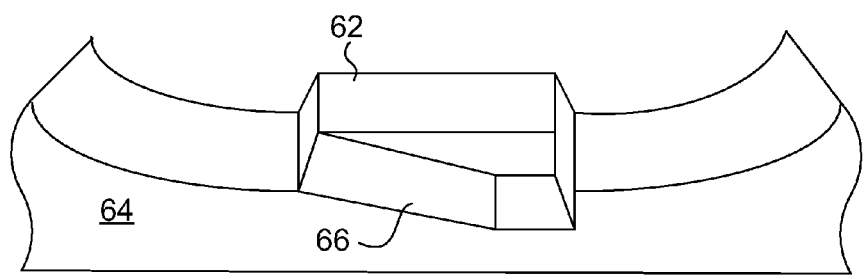
FIG. 3D shows a isometric partial view of the attachment mechanism of FIG. 3B.

The example of FIG. 2 uses clamps 48 to secure the cover 22. In some examples the clamps are lever-lock or twist-lock fasteners. In some examples, one edge of the cover is secured by a hinge or by inserting it into a gap, while other edges are secured by clamps. Other attachment methods may be used. In some examples, as shown in FIGS. 3A-3D, cut-out sections 60 of the cover 22 align with overhanging sections 62 of the structure 64 of the wheel well. The overhanging sections hold down the cover when it is rotated such that the cut-out sections no longer align with the overhanging sections. Angled interface elements 66 or springs 68 (shown in the alternative in FIGS. 3B and 3C) may be used in such a design to provide downward pressure on the gasket 48 when the cover is rotated. The gasket 46 is located inward (towards the center of the cover 22) from the outer circumference to avoid the cut-outs 60. FIG. 3D shows an example design of the angled element 66 from below and with exaggerated proportions for greater clarity. The circular cover 22 in FIGS. 3A-3D is for illustration only. Regardless of the attachment mechanism, the cover may be provided with ribs or other structural elements to enable it to serve as a load-bearing surface.

Figure 4:
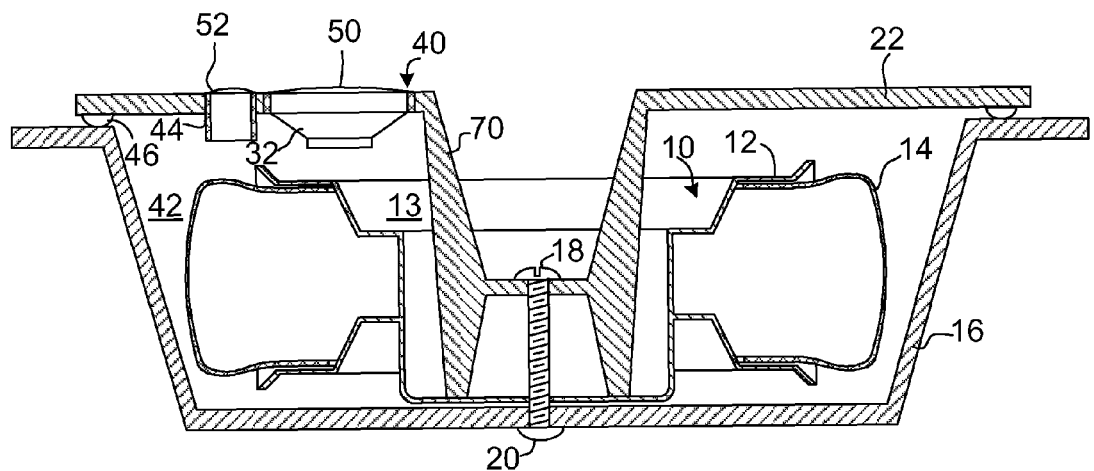

In some examples, as shown in FIG. 4, a section 70 of the cover 22 extends down to the wheel 12 and is secured to the floor of the wheel well 16 together with the wheel assembly 10 by the bolt 18 and nut 20. In this example, the potential size of the transducer 32 is reduced, but the total volume 42 remains greater than the volume of the enclosure 34 of FIG. 1. In some examples, the bolt 18 may extend upward to hold down the cover without the section 70 extending downward (not shown). In such a case, using the bolt 18 to hold down the cover 22 may require that the cover have sufficient rigidity that pressure is transferred from the bolt 18 at the center to the gasket 46 at the edge.

Figure 5:
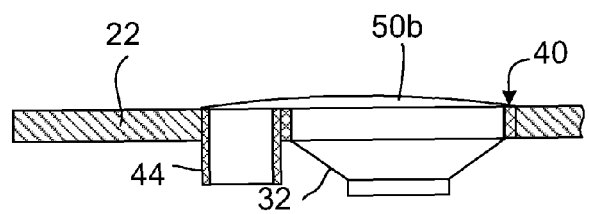
Figure 6:
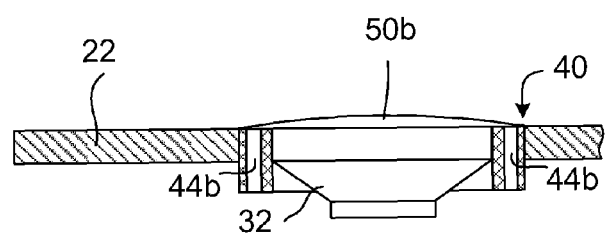
Figure 7:
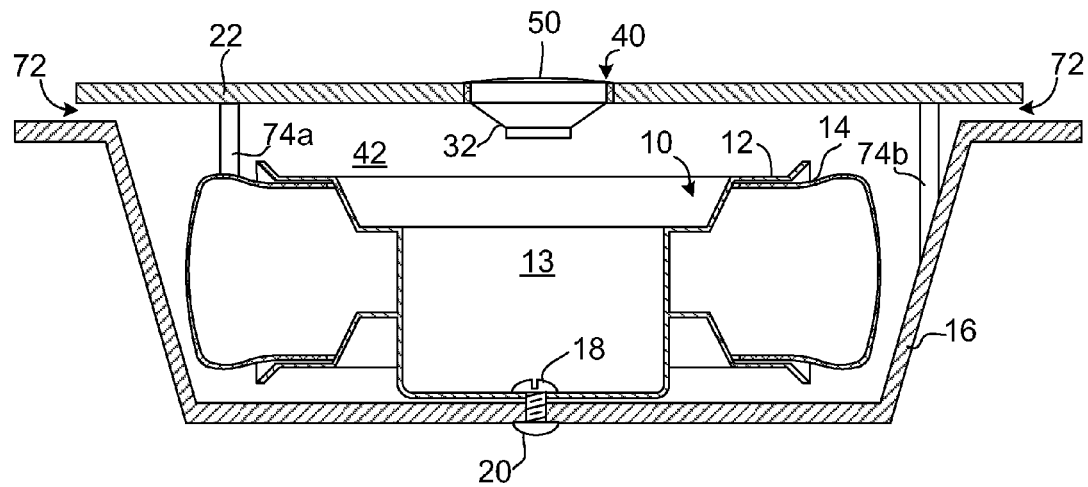
Figure 8:
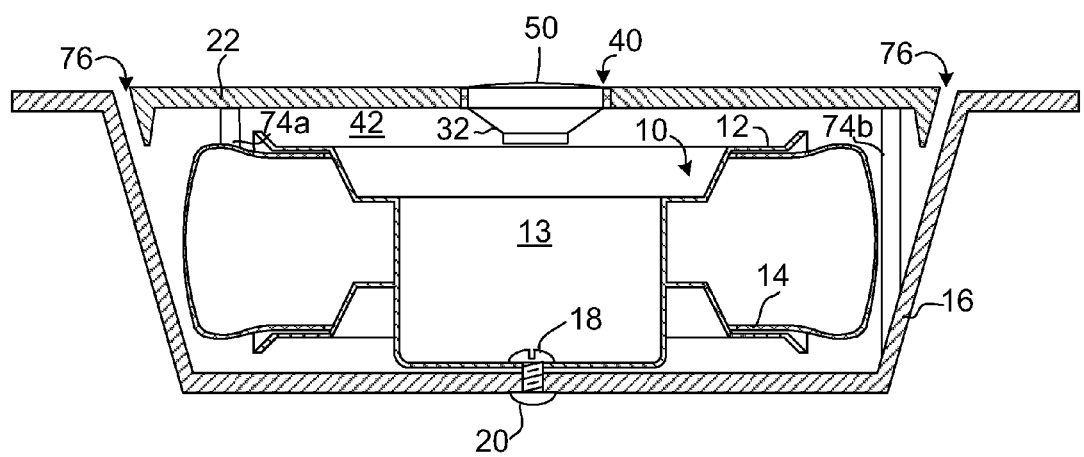

Various configurations of the port may be used. As shown in FIG. 5, the port 44 is located next to the transducer 32 and a single grille 50b covers both. In the example of FIG. 6, the port 44b surrounds the transducer 32 (with supports, not shown, supporting the transducer inside the opening of the port). Some examples of such a surrounding port are shown in U.S. Patent application publication 2007/0261911, incorporated here by reference. In some examples, as shown in FIGS. 7 and 8, the port is formed at the periphery of the cover 22. This provides the acoustic function of the port 44 while obviating the need to form an acoustic seal with the gasket 46, which is omitted. In the example of FIG. 7, the cover 22 is larger than the wheel well 16 and a horizontal port 72 is formed. Supports 74a extending upward from the wheel well or 74b extending downward from the cover provide anchor points for the cover while maintaining the width of the port. In the example of FIG. 8, the cover 22 is smaller than the wheel well 16 and a vertical port 76 is formed. The ports 72 and 76 may extend all the way around the perimeter or may extend through some angle less than 360°, depending on the size of port needed. The supports 74a and 74b work in the same manner, providing anchor points for the cover and maintaining the horizontal placement of the cover. The cover may be attached to supports 74a by bolts, clips, clamps, or any other suitable fastener. In FIGS. 7 and 8, only one support 74a and one support 74b are shown for clarity. In practice, only one type may be used, and one or more of each may be used to provide security and support. If only supports of type 74b, extending from the cover, are used, then an additional type of fastener may be used, such as clamps 48 (not shown). In such a case, the ports 72 or 76 may be interrupted at the locations of the fasteners, but otherwise may extend substantially all around the perimeter of the cover, if such size is needed.

Electrical connections to the transducer may be made in several ways. Connections on the rear of the cover may be coupled to vehicle wiring located inside the spare wheel well. Alternatively, a connection on the top of the cover may be coupled to vehicle wiring located outside the spare wheel well. In some examples, a connection on the rear of the transducer is coupled to wiring on the rear of the cover that is in turn coupled to a connection on the top of the cover. In some examples, the connections are integrated into the clamps 48 or other attachment mechanism so that the user does not have to disconnect and reconnect the connection as a separate step from removing and attaching the cover when changing the spare wheel.

Other implementations are within the scope of the following claims and other claims to which the applicant may be entitled.

What is claimed is:
1. A spare wheel well cover comprising:
a generally planar covering structure having a top surface and a bottom surface, such that:
the covering structure divides a listening volume comprising an interior of the vehicle from a spare wheel well volume comprising space bounded by the spare wheel well and the covering structure, and containing the spare wheel, when the spare wheel well cover is secured to the spare wheel well,
the top surface forms a portion of an interior surface of the listening volume, and
the bottom surface forms a portion of an interior surface of the spare wheel well volume; and
an electro-acoustic transducer mounted in a first opening through the covering structure, the first opening passing through both the top surface and the bottom surface, such that:
a first radiating surface of the electro-acoustic transducer radiates sound energy outward from the top surface and into the listening volume without intervening acoustic volumes formed by the covering structure, and
a second radiating surface radiates sound energy outward from the bottom surface and into the spare wheel well volume without intervening acoustic volumes formed by the covering structure.

2. The spare wheel well cover of claim 1 further comprising:
a gasket surrounding a perimeter of the spare wheel well cover.

3. The spare wheel well cover of claim 1 further comprising:
a bass reflex port mounted in a second opening through the covering structure, the second opening passing through both the top surface and the bottom surface,
such that the bass reflex port joins the listening volume to the spare wheel well volume.

4. The spare wheel well cover of claim 1 further comprising:
a bass reflex port mounted in the first opening in the covering structure, a first open end of the bass reflex port surrounding the first radiating surface of the electro-acoustic transducer circumferentially in the first opening and coupling the bass reflex port to the listening volume, and
a second open end of the bass reflex port surrounding the second radiating surface of the electro-acoustic transducer circumferentially and coupling the bass reflex port to the spare wheel well volume.

5. The spare wheel well cover of claim 1 wherein:
the spare wheel well cover is further arranged to cooperate with the spare wheel well to form a bass reflex port around a periphery of the spare wheel well cover, the bass reflex port comprising a gap between the spare wheel well cover and the structure of the spare wheel well.

6. The spare wheel well cover of claim 1 wherein:
the covering structure is bounded by a circumference having a notch, the notch corresponding to a protrusion in a structure of a vehicle forming the spare wheel well.

7. A system comprising:
a spare wheel well of an automobile;
a spare wheel well cover comprising:
a generally planar covering structure having a top surface and a bottom surface, such that, when the spare wheel well cover is secured to the spare wheel well:
the covering structure divides a listening volume comprising an interior of the vehicle from spare wheel well volume comprising space bounded by the spare wheel well and the covering structure;
the top surface forms a portion of an interior surface of the listening volume, and
the bottom surface forms a portion of an interior surface of the spare wheel well volume; and
an electro-acoustic transducer mounted in a first opening through the covering structure, the first opening passing through both the top surface and the bottom surface, such that:
a first radiating surface of the electro-acoustic transducer radiates acoustic energy outward from the first surface and into the listening volume without intervening acoustic structures being formed by the covering structure, and
a second radiating surface of the electro-acoustic transducer radiates acoustic energy outward from the second surface and into the spare wheel well volume without intervening acoustic structures being formed by the covering structure; and when the spare wheel well cover is secured to the spare wheel well; and
a fastener operable to secure the spare wheel well cover to the spare wheel well with a spare wheel enclosed such that the spare wheel well cover and the electro-acoustic transducer cooperate with the spare wheel well including the spare wheel to form an acoustic volume bounded by the bottom surface of the spare wheel well cover and an interior surface of the spare wheel well.

8. The system of claim 7 wherein:
the fastener comprises a latch secured to a vehicle structure surrounding the spare wheel well and selectively operable to apply downward force on the spare wheel well cover.

9. The system of claim 7 wherein:
the fastener comprises a protrusion of a vehicle structure, and
the spare wheel well cover is defined by a circumference having notch, the notch corresponding to the protrusion,
such that when the spare wheel well cover is positioned vertically lower than the protrusion, and rotated such that the notch and protrusion do not align, the protrusion applies downward force on the spare wheel well cover.

10. The system of claim 9 wherein:
the protrusion comprises a wedge-shaped structure configured to increase the downward pressure on the spare wheel well cover as the notch is rotated away from the protrusion.

11. The system of claim 9 wherein:
the protrusion comprises a spring configured to apply the downward pressure on the spare wheel well cover when the notch is rotated away from the protrusion.

12. The system of claim 7 wherein:
the spare wheel well cover comprises an extension extending into the spare wheel well; and
the fastener comprises a bolt and nut securing the cover to a floor of the spare wheel well, such that a spare wheel may be secured between the extension and the floor.

* * * * *